United States Patent Office 3,663,604
Patented May 16, 1972

---

3,663,604
POLYFLUOROCARBAMATES
Walter Blöchl, Karlsruhe, Germany, assignor to
FMC Corporation, New York, N.Y.
No Drawing. Filed Mar. 5, 1969, Ser. No. 804,699
Int. Cl. C07c 125/04
U.S. Cl. 260—482 C     9 Claims

ABSTRACT OF THE DISCLOSURE

Hydroxymethylated derivatives of fluorinated carbamates are useful to impart oil and water repellency to fibrous substrates. The carbamates have the formula:

$$R_f\text{—Y—OCONH}_2$$

where $R_f$ is a perfluoroalkyl group of 4–16 carbon atoms and Y is an alkylene bridge optionally interrupted with —O—, —S—, —SO—, —SO$_2$— and —NR— wherein R is lower alkyl or lower hydroxyalkyl. Examples are given where Y contains 3 to 5 carbon atoms.

BACKGROUND OF THE INVENTION (A) Field of the invention

This invention pertains to oil and water repellents useful in the treatment of fibrous materials and other porous substrates. The invention is particularly concerned with certain novel fluorinated carbamates for such purposes.

(B) Description of the prior art

The treatment of porous substrates such as leather, wood, textiles and the like for the purpose of modifying their properties, is well known. In the textile field, for instance, it has long been the practice to apply wax or resinous coatings on cloth in order to increase its water repellency. Later, emulsion polymers were used which not only imparted water repellency to textiles but also improved their oil and stain repellency. The drawback of such materials is that they are eventually removed from the cloth after a few dry cleanings and/or launderings.

Also materials were developed capable of actually reacting with the textile substrate, the so-called fiber reactive compounds, and these proved to be highly resistant to removal by ordinary cleaning procedures. A class of fiber reactive compounds which has attracted considerable interest are carbamate esters. In fact, much of the permanent-press clothing being produced today owes its crease resistance to the use of textiles treated with fiber reactive condensates derived from an alkyl carbamate and formaldehyde. However, such materials do not significantly increase, and in some instances may even decrease soil resistance and oil repellency. As a consequence, a great deal of effort is being directed to synthesizing fabric finishes in the hope of finding members which combine the properties of fiber fastness with oil, water and stain repellency.

SUMMARY OF THE INVENTION

It has now been discovered that excellent and long lasting oil and water repellency in a fibrous substrate can be achieved by treating it with an N-methylolated polyfluoroalkyl carbamate. The carbamate has the formula $$R_f\text{—Y—OCONH}_2$$

wherein $R_f$ is a perfluoroalkyl group of 4–16 carbon atoms and Y is an alkylene bridge optionally interrupted with —O—, —S—, —SO—, —SO$_2$— and —NR— wherein R is lower alkyl and lower hydroxyalkyl, the number of carbon atoms being 2–12 in the non-interrupted bridge and 1–60 in the interrupted bridge.

DESCRIPTION OF THE INVENTION AND THE PREFERRED EMBODIMENTS

The polyfluoroalkyl carbamates of the invention can be prepared using the known methods of ester synthesis. Generally speaking, it has been found convenient to employ a transesterification in which the requisite alcohol is reacted with a lower carbamate in accordance with the following outline:

$$R_f\text{—Y—OH} + ROCONH_2 \xrightarrow[\text{catalyst}]{\text{basic}} R_f\text{—Y—OCONH}_2 + ROH$$

wherein R is a lower alkyl, preferably methyl or ethyl, while $R_f$ and Y have the significance aforesaid.

In carrying out the transesterification, the usual procedure is to heat the alcohol with an excess of a lower alkyl carbamate in the presence of a basic alkoxide catalyst, while distilling off the byproduct of lower alcohol. Aluminum isopropoxide is an example of a basic catalyst; ethyl carbamate an example of a suitable lower alkyl carbamate. Although a solvent may be used, normally none is required. If one is used, it can be any of the typical organic liquids commonly employed for carrying out transesterification reactions.

The requisite alcohol component used in preparing the polyfluoroalkyl carbamates herein, include both known and novel chemical entities. Thus, where Y in the formula $R_f$—Y—OH designates an uninterrupted alkylene bridge, these alcohols are described in U.S. Pat. 2,642,416 where Y is CH$_2$; where Y is (CH$_2$)$_2$ in British Pat. 971,932 and where Y is (CH$_2$)$_{n>3}$ in U.S. Pat. 3,102,103.

Where Y is —O— interrupted, the alcohol can be obtained by the following illustrative reactions:

(1)
$$R_f(CH_2)_nOH + Na \longrightarrow R_f(CH_2)_nONa + X(CH_2)_{m-1}OCOR \longrightarrow$$
$$R_f(CH_2)_nO(CH_2)_{m-1}OCOR \xrightarrow{[H]} R_f(CH_2)_nO(CH_2)_mOH$$

where $n+m$ is equal to 3 to 24 carbon atoms.

(2)
$$R_fI + CH_2\!=\!CH(CH_2)_{1-20}OCH_2CH_2OH \xrightarrow{\text{free radical initiation}}$$
$$R_fCH_2CHI(CH_2)_{1-20}OCH_2CH_2OH \xrightarrow{\text{hydrogenation catalyst, alkali}}$$
$$R_f(CH_2)_{3-22}OCH_2CH_2OH$$

Reaction (2) is described in pending U.S. Ser. No. 751,364 to John T. Gresham.

Where Y is interrupted with —S—, reactions (1) and (2) can be carried out respectively using $R_f(CH_2)_nSH$ and $CH_2\!=\!CH(CH_2)_{2-20}SCH_2CH_2OH$. On controlled oxidation, the —S— can be oxidized successively to give —SO— and —SO$_2$—.

Where Y is interrupted with —NR—, reactions (1) and (2) can be carried out using respectively $$R_f(CH_2)_n\overset{R}{N}H \text{ and } CH_2\!=\!CH(CH_2)_{1-20}NRCH_2CH_2OH$$

Where Y contains multi-interruptions, such chains are built up by condensing the requisite $R_f$ substituted alkanol, alkyl amine or thiol with the requisite number of moles of alkylene oxide, alkylene imine, or episulfide, the latter three reactants having each a total of 2 to 3 carbon atoms any two of which are ring carbons.

As previously pointed out, the polyfluoroalkyl carbamates herein are converted to their methylolated derivatives prior to being applied to the fabric substrate. The reaction is generally carried out in the known manner of methylolating carbamates under alkaline conditions using aqueous formaldehyde. The methylolated product is a viscous oily or pasty material, and can be used without further purification.

The novel methylolated polyfluoroalkyl carbamates of the invention are applied to textiles and other porous substrates from an organic solution, evaporating off the solvent, followed by heat curing, preferably in the presence of an acid catalyst, at about 150° C. for about three minutes. Acid catalysts are those commonly used for durable press resins, e.g. zinc nitrate, magnesium chloride, magnesium fluoroborate, etc. Exemplary solvents include acetone, methanol, isopropanol, methyl ethyl ketone, tetrahydrofuran, and the like. Application from aqueous solvents is also possible as well as aqueous media containing a dispersion of the carbamate.

Where the polyfluoroalkyl carbamates are applied to the fabric from an organic solvent, it may be desirable to employ them in the form of their lower alkoxy methylated derivatives, which can be obtained by etherification of the methylol group with the lower alkanols such as methyl, ethyl, n-propyl, isopropyl, n-butyl, isobutyl alcohol or similar lower alkanols. Accordingly it is to be understood herein that when speaking of methylolated derivatives of the polyfluoroalkyl carbamates of subject invention such derivatives include alkoxy methylated derivatives.

Reference is now made to the following examples:

PREPARATION OF CARBAMATES AND METHYLOLATED DERIVATIVES THEREOF

Example 1: $C_7F_{15}CH_2CH_2CH_2OCH_2CH_2OCONH_2$

Seven grams of ethyl carbamate, 22.5 g. of $C_7F_{15}CH_2CH_2CH_2OCH_2CH_2OH$ and 0.2 g. of aluminum isopropoxide are placed in a flask equipped with a simple distillation head and receiver. The flask is heated to about 185° C. for about 75 minutes during which time 1.5 g. of crude ethanol is collected. After cooling to room temperature, the reaction mixture solidifies. The solids are added to 200 ml. of water acidified with dilute sulfuric acid. The mixture is extracted with ether, and the extract washed with aqueous sodium bicarbonate. The extract is dried and evaporated, affording 22.3 g. of crude carbamate which is recrystallized from petroleum ether to give 13.3 g. of purified $C_7F_{15}CH_2CH_2CH_2OCH_2CH_2-OC(O)NH_2$,

M.P. 68° C.

The $C_7F_{15}CH_2CH_2CH_2OCH_2CH_2OH$ is obtained by reducing 91.0 g. of $C_7F_{15}CH_2CHICH_2OCH_2CH_2OH$ dissolved in 400 ml. of absolute ethanol containing 13.0 g. of potassium hydroxide and 10.0 g. of 10% palladium on charcoal. The reaction is conducted in a stirred autoclave under 850 p.s.i. of hydrogen for 42 hours at 50° C.

The reaction mixture is filtered to remove the catalyst and concentrated at reduced presure. The residue is taken up in methylene chloride, washed with water twice and dried over magnesium sulfate. After removing the drying agent and the solvent, the residue is distilled at reduced pressure to give 52.7 g. of fluoroalcohol, B.P. 81–86° C./0.5 mm., $n_D^{25}$ 1.3447.

The $C_7F_{15}CH_2CHICH_2OCH_2CH_2OH$ is obtained by heating at 85° C. under nitrogen for about three days, a mixture of 75 g. (0.15 mole) of $C_7F_{15}I$, 16.8 g. (0.165 mole) of 2-allyloxyethanol and 0.3 g. of azobis(isobutyronitrile) as catalyst. During this time, about 0.1 g. of the catalyst is added periodically. The unreacted starting materials are removed by stripping at reduced pressure yielding 75.3 g. of $C_7F_{15}CH_2CHICH_2OCH_2CH_2OH$.

Methylolation of $C_7F_{15}CH_2CH_2CH_2OCH_2CH_2OCONH_2$

Twenty-four grams of 36% aqueous formaldehyde and 55.5 g. of $C_7F_{15}CH_2CH_2CH_2OCH_2CH_2OC(O)NH_2$ are placed in a flask equiped with a mechanical stirrer. The pH is adjusted to about 9 with dilute sodium hydroxide. The reaction mixture is heated to 80° C. for two hours with good stirring. The resulting paste is stirred overnight at room temperature. Infrared analysis indicates methylolation has occurred by the absence of N—H absorption and the presence of strong OH band centered at 2.96µ.

Example 2: $C_8F_{17}CH_2CH_2CH_2OCH_2CH_2OCONH_2$

This compound is prepared following the procedure of Example 1. The purified product melts at 81° C. The intermediate materials are identified as follows:

(a) $C_8F_{17}CH_2CH_2CH_2OCH_2CH_2OH$; B.P. 91–94° C./0.3 mm., $n_D^{25}$ 1.3437

(b) $C_8F_{17}CH_2CHICH_2OCH_2CH_2OH$; B.P. 118° C./3 mm., M.P. 42° C.

Methylolation of $C_8F_{17}CH_2CH_2CH_2OCH_2CH_2OCONH_2$

This reaction is carried out in accordance with the procedure of Example 1. In this instance the product is purified by dissolving 65 g. of the crude methylol derivative in 107 g. of isopropyl alcohol and filtering. Isopropyl alcohol (138 g.) and water (563 g.) are added to the filtrate to form a homogeneous solution. The pH is adjusted to 8. On standing overnight, a precipitate (14.9 g.) formed which is separated by filtration and identified as the unreacted carbamate. From the filtrate, 27.8 g. of the methylol compound is obtained.

Example 3:

$C_7F_{15}CH_2CH_2CH_2N(C_2H_5)CH_2CH_2OCONH_2$

This compound is prepared by reacting $C_7F_{15}CH_2CH_2CH_2N(C_2H_5)CH_2CH_2OH$ with ethyl carbamate in the presence of aluminum isopropoxide, after the manner of Example 2, for reacting the corresponding ether alcohol. The intermediate products for this example are prepared as follows:

(a) $C_7F_{15}CH_2CH_2CH_2N(C_2H_5)CH_2CH_2OH$: To a solution of 9.1 g. of $C_7F_{15}CH_2CH_2CH_2NHC_2H_5$ and 0.2 g. of phenol in 50 ml. of 95% ethanol heated to 60° C. is slowly added by bubbling about 1 g. of ethylene oxide. The mixture is refluxed for ½ hour and then about 0.2 g. of ethylene oxide is added over a period of 15 minutes followed by refluxing for an additional ½ hour. The reaction product is stripped affording a viscous oil which shows hydroxyl absorption by infrared analysis.

(b) $C_7F_{15}CH_2CH_2CH_2NHC_2H_5$: Twelve grams of $C_7F_{15}CH=CHCH_2NHC_2H_5$, 60 ml. of absolute ethanol and platinum oxide are hydrogenated in a Parr shaker for about 40 hours. The catalyst is removed by filtration and the ethanol removed by evaporation at reduced pressure. Infrared analysis of the product indicates absence of unsaturation.

(c) $C_7F_{15}CH_2CHICH_2NHC_2H_5$: Five grams of perfluoroheptyl iodide, 4.3 g. of N-allylethylamine and about 0.1 g. of azobis(isobutyronitrile) are heated together at 70–75° C. under a nitrogen atmosphere. The mixture slowly becomes dark and after 1 hour about 0.1 g. of the catalyst is added. Heating is continued for about three more hours during which time additional catalyst is added. On cooling, the crude $C_7F_{15}CH_2CHICH_2NHC_2H_5$ solidifies. The product is dissolved in 25 ml. of 95% ethanol and added to a solution of 3.3 g. of potassium hydroxide in 50 ml. of 95% ethanol. The mixture is stirred and heated over two hours on a steam bath and then diluted with approximately 200 ml. of water. After separating the lower layer, the upper layer is extracted with methylene chloride. The lower layer and extracts are combined, dried and evaporated to give an oil, B.P. 68–73° C./4 mm.

Methylolation of
$C_7F_{15}CH_2CH_2CH_2N(C_2H_5)CH_2CH_2OCONH_2$

A mixture of 2.8 g. (0.005 mole) of the carbamate, 3 ml. of dioxane and 1.2 g. (0.014 mole) of 36% aqueous formaldehyde solution, adjusted to pH 9, is slowly heated to 80° C. with stirring. After stirring for about 4 hours at 80° C. the mixture becomes homogeneous. Stirring is continued overnight at room temperature. The methylol derivative is isolated in the usual manner affording a viscous oil showing hydroxyl absorption by infrared analysis.

Example 4: $C_7F_{15}CH_2CH(CH_3)OCONH_2$

This compound is prepared by reacting $C_7F_{15}CH_2CH(CH_3)OH$ with ethyl carbamate in the presence of aluminum isopropoxide after the manner of the previous examples. The crude product is washed with dilute sulfuric acid, dried and crystallized from chloroform. The purified material melts at 117° C. The intermediates for this example are prepared as follows:

(a) $C_7F_{15}CH_2CH(CH_3)OH$: Thirty-nine grams of $C_7F_{15}CH_2CHICH_2OH$ is dissolved in 50 ml. of absolute alcohol and added to a mixture of 5 g. of potassium hydroxide, 7 g. of palladium on charcoal and 100 ml. of absolute alcohol. The mixture is hydrogenated in a Parr shaker for 2½ days at room temperature. Thirty milliliters of water is added and the catalyst separated by filtration. Additional water is added to the filtrate and the mixture extracted with methylene chloride. The methylene chloride extracts are dried over magnesium sulfate and evaporated, affording 25.7 g. B.P. 96–8° C./10 mm. of $C_7F_{15}CH_2CH(CH_3)OH$.

(b) $C_7F_{15}CH_2CHICH_2OH$: One hundred grams of perfluoroheptyl iodide, 14 g. of allyl alcohol, and 0.2 g. of azobis(isobutyronitrile) are heated together for four days at 95° C. under nitrogen atmosphere. Additional catalyst is added periodically. The unreacted starting materials are removed by evaporation at reduced pressure, affording 90.8 g. of a light yellow solid.

Methylolation of $C_7F_{15}CH_2CH(CH_3)OCONH_2$

A mixture of 4.7 g. (0.01 mole) of the carbamate, 2.26 g. (0.027 mole) of 36% aqueous formaldehyde solution, 4 ml. of dioxane, and a few drops of aqueous sodium hydroxide solution are stirred and heated slowly to 80° C. After stirring for 2 hours at 80° C. the mixture is stirred overnight at room temperature. The mixture is diluted with 40 ml. of water and extracted twice with ether. After drying, the ether extracts are evaporated affording 4.65 g. of the highly viscous methylol derivative.

Example 5: $C_8F_{17}CH_2CH_2SO_2CH_2CH_2OCONH_2$

This compound is prepared by reacting $C_8F_{17}CH_2CH_2SO_2CH_2CH_2OH$ with ethyl carbamate in the presence of aluminum isopropoxide according to the procedure of the previous examples. The intermediates for this example are prepared as follows:

(a) $C_8F_{17}CH_2CH_2SO_2CH_2CH_2OH$: To a stirred mixture of 10 ml. of 30% hydrogen peroxide and 20 ml. of acetic acid is added 3.5 g. of $C_8F_{17}CH_2CH_2SCH_2CH_2OH$. The mixture is stirred at 70° C. for an hour, and gradually becomes colorless. The solution is evaporated in a current of air until crystallization begins. When cool, the white product is filtered, water washed, and dried. The product is then recrystallized from chloroform to give 1.8 g. of white powder, M.P. 143–147° C.

(b) $C_8F_{17}CH_2CH_2SCH_2CH_2OH$: To a solution of 0.25 g. (0.011 mole) of sodium in 20 ml. of absolute alcohol is added 4.8 g. (0.01 mole) of $C_8F_{17}CH_2CH_2SH$ with stirring. After five minutes of stirring, 0.9 g. (0.011 mole) of 2-chloroethanol is added. A precipitate is formed. The mixture is stirred at reflux for three hours, cooled, and filtered from the solid. The filtrate is concentrated under reduced pressure to leaving 4.0 g. of the sulfide, M.P. 68–70° C.

(c) $C_8F_{17}CH_2CH_2SH$: A mixture of 24.5 g. (0.043 mole) of $C_8F_{17}CH_2CH_2I$, 3.5 g. of thiourea, and 55 ml. of 95% ethyl alcohol are refluxed together for 18 hours. Under a nitrogen atmosphere, a solution of 4.2 g. of sodium hydroxide in 35 ml. of water is added and heating continued for two hours. The lower layer is separated. After acidifying the upper layer, it is extracted with methylene chloride and the extracts combined with the lower layer. The methylene chloride solution after drying is evaporated to a yellow oil which is distilled at reduced pressure giving 8.5 g. of purified material boiling at 63–4° C./3 mm.

Methylolation of $C_8F_{17}CH_2CH_2SO_2CH_2CH_2OCONH_2$

A mixture of 0.01 mole of the carbamate, 6 ml. of dioxane, 0.027 mole of 36% aqueous formaldehyde solution, and 2 drops of 10% sodium hydroxide is stirred and heated to 80° C. for 3½ hours and stirred overnight at room temperature. Upon removal of the solvents, a thick pasty material of the methylolated material is recovered.

Example 6: $C_8F_{17}CH_2CH_2CH_2OCONH_2$

The following reagents are placed in a Parr shaker: 2-iodo-3-(perfluorooctyl)propyl carbamate (9.7 g. 0.015 mole), 5% palladium on charcoal (3 g.), absolute alcohol (80 ml.), and powdered potassium carbonate (2.3 g., 0.0165 mole). The apparatus is filled with hydrogen and shaken for 18 hours. The pressure drop during this period is 2.5 p.s.i. The charcoal is filtered off and washed repeatedly with alcohol until the solid is fluffy when dry. The filtrate is transferred to a separatory funnel. Water is added and the product is then extracted with ether. The ether solution is dried over sodium sulfate. The ether is removed by evaporation under vacuum and the resultant solid recrystallized from methylene chloride. The yield is 6 g. (75%) of white crystals having a M.P. of 102° C.

The intermediate 2-iodo-3-(perfluorooctyl)propyl carbamate is prepared as follows: In a three-neck flask equipped with stirrer, thermometer, nitrogen gas inlet, condenser, stopper and bubbler are placed perfluorooctyl iodide (27.3 g. 0.05 mole), allyl carbamate (5.1 g., 0.05 mole) and azobis(isobutyronitrile) (0.05 g., .0003 mole). The flask is thoroughly flushed with nitrogen. On heating to 78° C. an exothermic reaction takes place. The bath is removed, but the temperature continues to increase to about 126° C. Heating is resumed when the temperature in the flask decreases to 110° C. Further additions of a like amount of azobis(isobutyronitrile) are made ½ hour and 1½ hours after the resumption of heating. In neither case is an exotherm produced. Total reaction time is three hours. The yield is 32.2 g. (99+%. Crystallization from methylene chloride gives three crops having a combined melting point range of 100–102° C. and a total weight of 23.9 g. (74%).

Utility of the methylolated carbamates

The methyloated carbamates of the invention are evaluated for their oil and water repellency using the following test procedures:

Water repellency.—Resistance to wetting (spray test) AATCC (American Association of Textile Chemists and Colorists)—standard test method 22–1952

This test is applicable to any textile fabric. It measures the resistance of fabrics to wetting by a water spray and the results depend primarily on the degree of hydrophobicity inherent in the fibers and yarns and subsequent treatments to which the fabric is subjected. Water is sprayed against the taut surface of a test specimen. Evaluation of the wetted pattern is readily brought about by comparing the wetted pattern with standard wetting pattern pictures.

Rating: Characterized
100 — No sticking or wetting of the upper surface.
90 — Slight random sticking or wetting of the upper surface.
80 — Wetting of the upper surface at spray points.
70 — Partial wetting of the whole of the upper surface.
50 — Complete wetting of the whole of the upper surface.
0 — Complete wetting of the whole of the upper and lower surfaces.

The test specimens of minimum size of 7" x 7" (seven inches by seven inches) are conditioned at 70° F. and 65 percent relative humidity for a minimum of four hours before testing.

The test specimen, fastened securely and wrinkle-free in a metal hoop having a diameter of 6 inches, is placed and centered 6 inches under a standard spray nozzle at an angle of 45° to the horizontal. Two hundred and fifty milliliters of water at 80±2° F. is poured into a funnel attached above the spray nozzle. The spray lasts 25 to 30 seconds at the end of which time the hoop is taken by one edge and the opposite edge tapped smartly once against a solid object with the set side facing the solid; this procedure is repeated with the hoop reversed 180°.

Oil repellency

The method is the 3M test procedure taken from the Textile Research Journal, p. 320, April 1962.

The Minnesota Mining oil repellency test is based on the different pentrating properties of the two hydrocarbon liquids, mineral oil ("Nujol") and n-heptane. "Nujol" is the trade name for white mineral or paraffin oil being a mixture of hydrocarbons having a density for "light" oil in the range of 0.83 to 0.860 and for "heavy" oil in the range of 0.875 to 0.905.

| | Percent heptane (by volume) | Percent "Nujol" by volume |
|---|---|---|
| Oil repellency rating: | | |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 50 | 0 | 100 |
| 0 | | (¹) |

¹ No hold out to "Nujol".

The standard oil-heptane mixtures are contained in small stoppered medicine-dropper bottles. A drop of each mixture of "Nujol" and heptane is placed on the fabric. The appearance of the test oil is observed through the drop. Note is made whether wetting or penetration occurs. The number corresponding to that mixture containing the highest percentage of heptane which does not penetrate or wet the fabric after three minutes is considered the oil repellency rating of the system.

Application to textiles

Samples of 80" x 80" cloth are soaked in a solution of the methylolated carbamates herein adjusted to pH 6 with hydrochloric acid and containing magnesium chloride as curing agent. After soaking a few minutes, the wet cloth is removed from the bath, air dried and then cured at about 155° C. The results are as follows:

| Methylolated carbamate | Cloth | Water repellency | Oil repellency |
|---|---|---|---|
| Example: | | | |
| 1 | Cotton | 70 | 100 |
| 2 | do | | 100 |
| 3 | do | | 110 |
| 4 | do | | 100 |
| 5 | do | | 100 |

As pointed out under Summary of the Invention, the methylolated carbamate esters herein not only render porous substrates oil and water repellent, but that the effect is remarkably durable. The methylolated carbamate of Example 1, which is typical and representative of the durability of these compounds, showed no loss in water repellency after 10 launderings and no loss in oil repellency after 15 launderings.

What is claimed is:

1. A polyfluorocarbamate of the formula $$R_f-Y-OCONH_2$$

wherein $R_f$ is perfluoroalkyl of 4–16 carbon atoms and Y is an alkylene bridge interrupted with —O—, —S—, —SO—, —SO$_2$— and —NR—, where R is lower alkyl and lower hydroxy alkyl, the number of carbon atoms being 1–60 in the interrupted bridge, and the hydroxymethylated and lower alkoxymethylated derivatives of said polyfluorocarbamate.

2. A polyfluorocarbamate according to claim 1, wherein Y is interrupted with —O—.

3. A polyfluorocarbamate according to claim 1, wherein Y is interrupted with —S—.

4. A polyfluorocarbamate according to claim 1, wherein Y is interrupted with —SO—.

5. A polyfluorocarbamate according to claim 1, wherein Y is interrupted with —SO$_2$—.

6. A polyfluorocarbamate according to claim 1, wherein Y is interrupted with —NR—.

7. A polyfluorocarbamate according to claim 2 and having the formula $$C_8F_{17}CH_2CH_2CH_2OCH_2CH_2OCONH_2$$

8. A polyfluorocarbamate according to claim 6 and having the formula $$C_7F_{15}CH_2CH_2CH_2N(C_2H_5)CH_2CH_2OCONH_2$$

9. A polyfluorocarbamate according to claim 5 and having the formula $$C_8F_{17}CH_2CH_2SO_2CH_2CH_2OCONH_2$$

References Cited

UNITED STATES PATENTS 2,958,613  11/1960  Nelson _____ 117—121

LORRAINE A. WEINBERGER, Primary Examiner

P. J. KILLOS, Assistant Examiner

U.S. Cl. X.R.

117—121, 143 R; 260—583 GG, 584 R, 607 A, 609 A, 615 R, 633

UNITED STATES PATENT OFFICE
CERTIFICATE OF CORRECTION

Patent No. 3,663,604　　　　　　　Dated 5/16/72

Inventor(s) Walter Blöchl

It is certified that error appears in the above-identified patent and that said Letters Patent are hereby corrected as shown below:

Column 2, line 55 "2-20" should read --1-20--.

Signed and sealed this 10th day of September 1974.

(SEAL)
Attest:

McCOY M. GIBSON, JR.　　　　　　　　C. MARSHALL DANN
Attesting Officer　　　　　　　　　　Commissioner of Patents